United States Patent [19]

Oren et al.

[11] Patent Number: 4,750,859
[45] Date of Patent: Jun. 14, 1988

[54] METHOD OF LOADING A SEMITRAILER

[76] Inventors: Donald G. Oren, 3105 Sandy Hook Dr., St. Paul, Minn. 55113; David D. Oren, 1270 Payne Ave., St. Paul, Minn. 55101

[21] Appl. No.: 910,645

[22] Filed: Sep. 23, 1986

Related U.S. Application Data

[60] Division of Ser. No. 842,310, Mar. 21, 1986, Pat. No. 4,685,720, which is a continuation of Ser. No. 529,107, Sep. 2, 1983, Pat. No. 4,592,585.

[51] Int. Cl.$^4$ .............................................. B65G 67/04
[52] U.S. Cl. ..................... 414/786; 414/373; 414/572
[58] Field of Search ............... 414/345, 346, 347, 373, 414/395, 398, 400, 539, 540, 541, 542, 572, 786; 410/79; 244/137 R

[56] References Cited

U.S. PATENT DOCUMENTS

| | | | |
|---|---|---|---|
| 1,829,527 | 10/1931 | Lewis | 296/30 |
| 2,142,798 | 1/1939 | Murphy | 105/422 |
| 2,171,381 | 8/1939 | Werner | 296/30 |
| 2,320,001 | 5/1943 | Lundvall | 105/422 |
| 2,857,196 | 10/1958 | Sheppard | 296/181 |
| 3,006,486 | 10/1961 | Cook et al. | 414/542 |
| 3,185,112 | 5/1965 | Johnston | 296/183 X |
| 3,210,118 | 10/1965 | Chieger | 296/106 |
| 3,295,881 | 1/1967 | Worthington | 414/542 |
| 3,377,039 | 4/1968 | Hayes | 410/112 |
| 3,572,513 | 3/1971 | Tantlinger et al. | 414/542 X |
| 3,692,349 | 9/1972 | Ehrlich | 296/181 |
| 3,814,029 | 6/1974 | McNalley et al. | 410/111 |
| 3,893,399 | 7/1975 | Lewis et al. | 410/112 |
| 4,592,585 | 6/1986 | Oren et al. | 296/181 |

FOREIGN PATENT DOCUMENTS

| | | | |
|---|---|---|---|
| 2502383 | 7/1975 | Fed. Rep. of Germany | 296/183 |
| 112524 | 3/1966 | Netherlands | 296/183 |

Primary Examiner—Leslie J. Paperner
Attorney, Agent, or Firm—Merchant, Gould, Smith, Edell, Welter & Schmidt

[57] ABSTRACT

A semitrailer (20) with improvements providing for increased use of available floor space is disclosed. The trailer (20) includes two sidewalls (22), a front end wall (24), a top wall (26) interconnecting said sidewalls (22) and front end wall (24) to enclose the semitrailer (20), and a back end (30) including hinged doors (32) providing for access to the inside of the semitrailer (20). A floor (28) interconnecting the sidewalls (22), is arched upward between the sidewalls (22) to provide a raised floor surface near a mid-portion of the floor (28) generally along the longitduinal extent thereof. Furthermore, the trailer includes a support structure (34) for supporting the floor (28) and the sidewalls (22, 24, 30), and the top wall (26). The arched floor (28) causes articles or pallets (48) loaded onto the trailer to tip outwardly toward the sidewalls (22) of the trailer (20) such that the top of the pallets (48) are spaced further apart.

The present invention further relates to a method for loading the trailer (20) wherein two rows (100, 102) of the pallets (48) are formed in the trailer (20) along the longitudinal extent thereof. The rows (100, 102) extend substantially across the entire width of the trailer (20) such that maximum floor space is utilized.

4 Claims, 4 Drawing Sheets

U.S. Patent  Jun. 14, 1988  Sheet 1 of 4  4,750,859
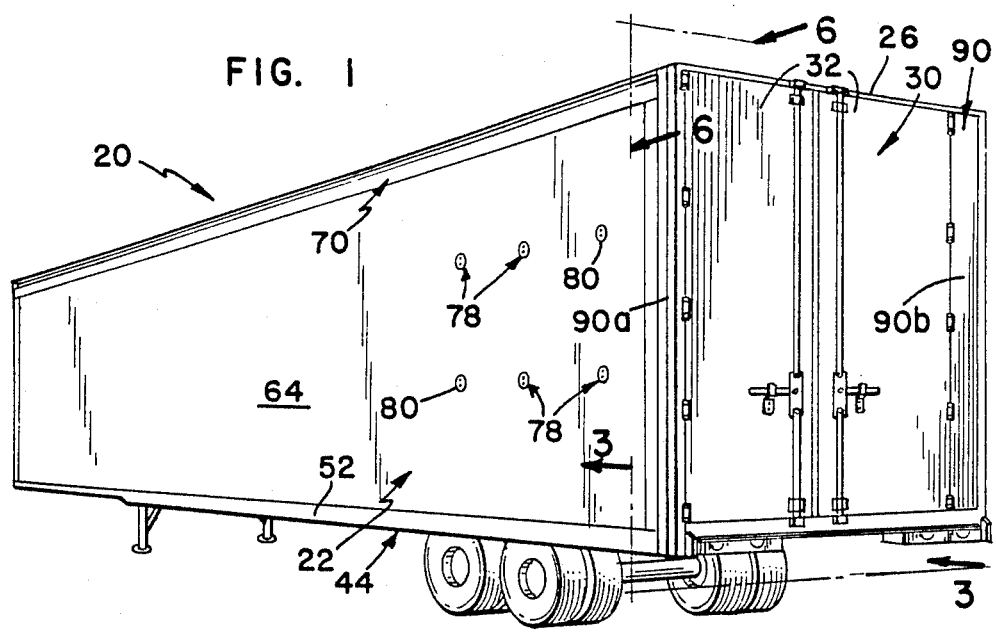
FIG. 1
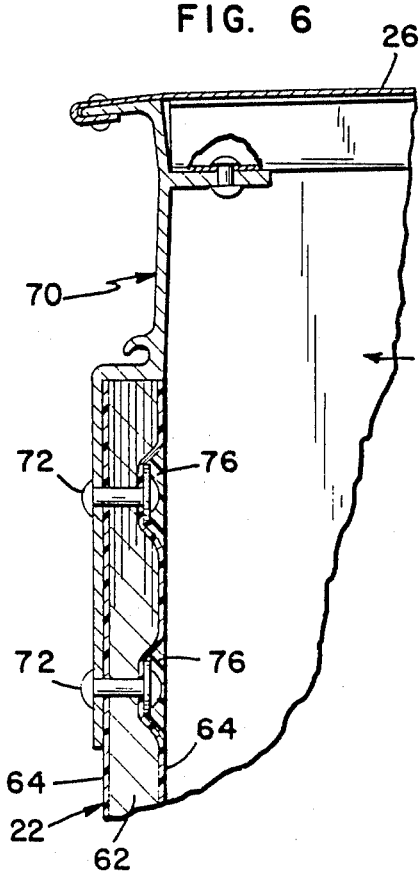
FIG. 6
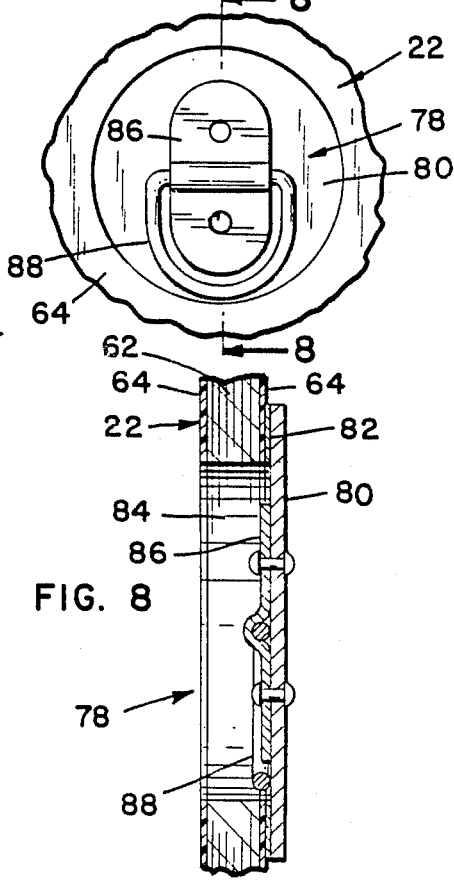
FIG. 7
FIG. 8

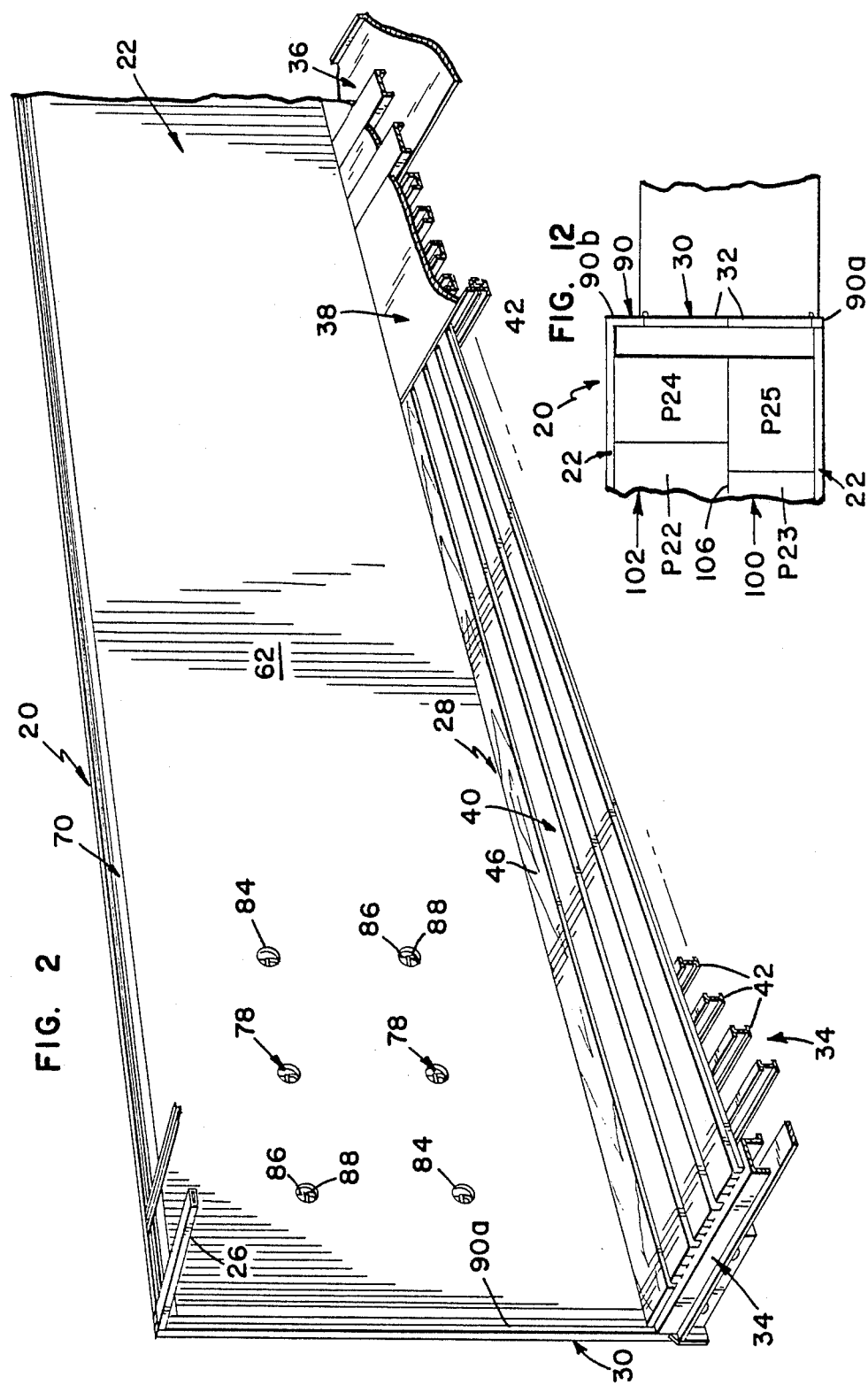

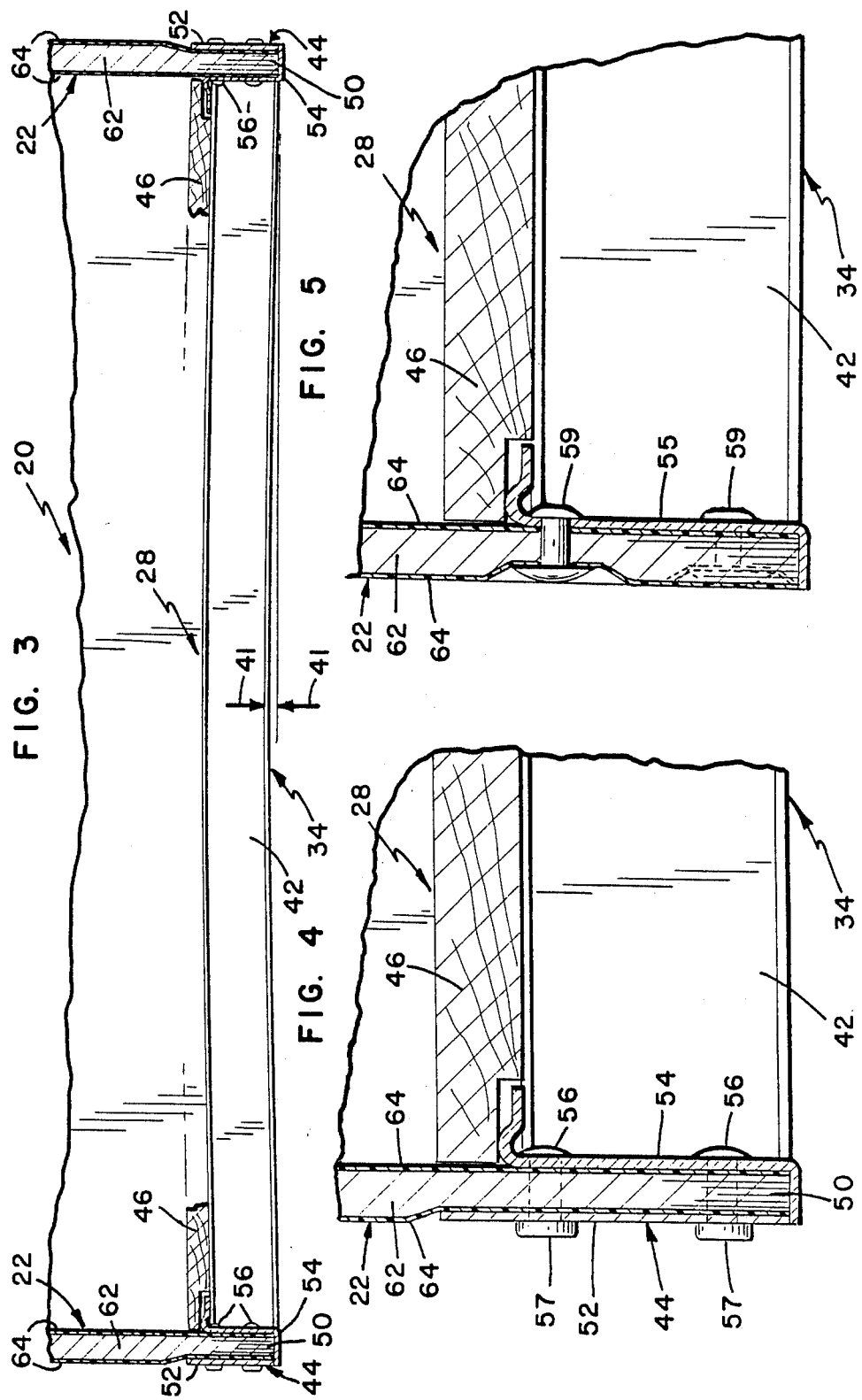

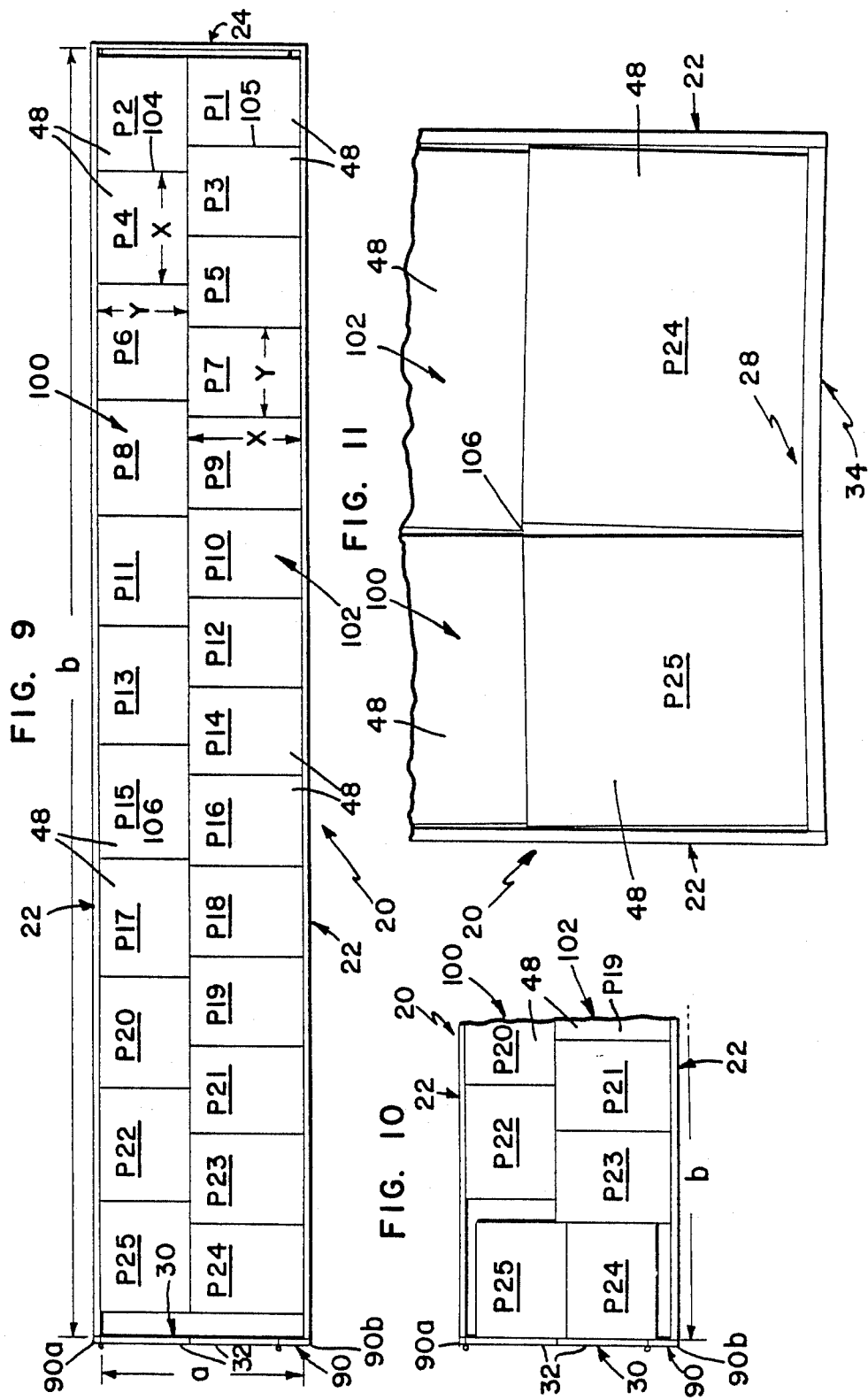

METHOD OF LOADING A SEMITRAILER

This is a division of application Ser. No. 842,310, filed Mar. 21, 1986, now U.S. Pat. No. 4,685,720, which is a continuation of application Ser. No. 529,107, filed Sept. 2, 1983, now U.S. Pat. No. 4,592,585.

BACKGROUND OF THE INVENTION

The trucking industry has long served as our country's major means of transporting raw materials, containers, finished products, commodities, etc. to all areas of the country and in particular to those areas not served by the railroads or the airlines. This is partially due to the fact that the trucking industry provides for more flexibility and efficiency in delivering direct to the shipping destination than is possible with the railroads and/or airlines.

However, due to increasing overhead costs in the trucking industry, such as the cost of gas, licenses, maintenance, regulation compliance, etc., the industry has had to take measures to further increase its efficiency. One approach to increase efficiency is to increase the size of the trailer so that more goods and materials can be hauled. However, in addition to practical limitations on the size of a trailer there are also various local, state and federal regulations which limit the size of trailers. Therefore once the trailers, particularly enclosed semitrailers, have been made as large as practically and legally allowable, ways must be looked at to maximize the use of available space on the inside of the semitrailer.

Many items are packaged in pallets which are loaded into the semitrailer by a forklift or the like. The density or the closeness with which pallets or for that matter any item can be loaded into a trailer has practical limitations. For example, when maneuvering pallets onto a trailer, the edges of the pallets will frequently make contact so as to interfere with the loading process. Furthermore, if the pallets are loaded too close to the inside walls of the trailer, tie down rings or D-rings as they are commonly known, will interfere. Also, the top rail structure of the semitrailer interconnecting the ceiling with the sidewalls projects outwardly to provide an obstruction on the inside of the trailer which prohibits efficient use of space.

Additionally, the door frame on the back end of the semitrailer also tends to obstruct or interfere with the loading process as it projects inwardly to provide an opening having a width less than that of the inside of the semitrailer.

Also critical to the efficient use of space, is the use of a loading pattern which will provide for maximum use of available space. Current loading methods, particularly in the case of pallets, do not provide for such efficient use of space.

For the above reasons and others, trailer space is often not efficiently utilized. It is critical to the industry in order for it to maintain its competitiveness and to provide the customer with continued efficient service that these obstacles preventing the efficient use of trailer space be solved. The present invention does indeed solve these problems and many others, thereby providing for more efficient use of available trailer space.

SUMMARY OF THE INVENTION

The present invention relates to a semitrailer for hauling articles. The semitrailer includes two sidewalls, a front end wall, a top wall interconnected to the sidewalls and the front end wall to enclose the semitrailer, and a back end including hinged doors providing for access to the inside of the semitrailer. The trailer further includes a floor interconnecting the sidewalls. The floor is arched upwardly between the sidewalls to provide for a raised floor surface near a mid-portion along the longitudinal extent thereof. Accordingly, articles loaded into the trailer are tipped outwardly toward the sidewalls of the trailer thereby reducing the likelihood that the articles will interfere with one another during the loading process. The semitrailer further includes a support structure for supporting the floor and the sidewalls.

The present invention further relates to a method of loading articles into a trailer. The method includes the formation of two rows of articles extending lengthwise in a semitrailer having an arched floor, the mid-portion of the floor being raised above the outer edge portions thereof proximate the sidewalls. The method of forming the two rows includes positioning a first article in either a first or second row at the front end of the trailer, the side of the article facing the back end of the trailer forming the leading edge of the row. A second article is then positioned in the vacant row at the front end of the trailer, the side of the second article facing the back end of the trailer forming the leading edge of the second row. Third and subsequent articles are positioned in whichever of the first or second rows whose leading edge is further forward. The third and subsequent articles are positioned in the same general orientation as the other articles in their respective rows.

The applicants, in attempting to maximize the use of available semitrailer space, have discovered that by raising the floor of the semitrailer near the center of the floor between the sidewalls, the loading and positioning of pallets or other articles so as to form two rows along the longitudinal extent of the semitrailer is facilitated. The raised floor causes the pallets in each of the rows to tilt toward the sidewalls and away from the pallets in the adjacent row. This is contrary to current trailer designs wherein the floor is relatively flat in an effort to provide stability of the pallets. However, the applicants have discovered that stability is not greatly affected by raising the floor provided the rise in the floor is not too great. Preferably the floor is only raised sufficiently to cause the tilting of the pallets to occur.

A particularly advantageous feature of the present invention is that it does provide for maximum use of available space in a semitrailer. However, it will be appreciated that the present invention provides several other advantages such as facilitating the loading of bulky articles into the trailer, etc. Furthermore, the applicants have discovered several other trailer modifications and improvements which facilitate loading and maximum use of available trailer space.

In one embodiment of the present invention, the sidewalls are interconnected to the support structure by U-shaped brackets or bottom rail members. The lower edge of the sidewall which is inserted into the U-shaped bracket is of lesser thickness than the rest of the sidewall such that the combined thickness of the lower edge of the sidewall and the U-shaped bracket is approximately that of the rest of the sidewall. Accordingly, the U- shaped brackets do not add to the overall width of the trailer whereby the sidewalls can be extended out to the maximum width practical and allowed by federal regulations without having to compensate for the U-shaped brackets. In yet another embodiment, the sidewalls are interconnected to the support structure by an L-shaped bracket along the lower edge of the sidewalls. The L-shaped bracket is positioned on the inside of the sidewall structure so as to not extend beyond the outer surface of the sidewalls and therefore not increase the overall effective width of the trailer.

In one embodiment of the present invention an offset door frame is utilized in conjunction with the loading doors at the rear of the trailer. The offset door frame has a width along one side approximately that of the sidewall thickness and a width along the opposite side roughly double that of the first side. Accordingly, the frame along the narrow side does not interfere with the loading process, while the other side of the frame provides the semitrailer with the acquired structural integrity to prevent twisting or distortion thereof.

In one embodiment of the present invention, tie down fasteners along the inside walls of the semitrailer are recessed into the walls so as to not project inwardly beyond the inner surface of the walls and thereby not interfere with the loading process.

In yet another embodiment, the fasteners utilized to attach the top wall or ceiling portion of the semitrailer along the top edge of the sidewalls are recessed into the inside surface of the sidewalls. The recesses are then filled in to provide the sidewalls with a substantially smooth inside surface. Accordingly, the fasteners also do not interfere with the loading of pallets or the like.

These and various other advantages and features of novelty characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views:

FIG. 1 is a view in perspective of a semitrailer embodying the principles of the present invention;

FIG. 2 is a fragmentary perspective view of the inside of the trailer as generally shown in FIG. 1;

FIG. 3 is a view generally along line 3—3 in FIG. 1;

FIG. 4 is an enlarged fragmentary sectional view illustrating the use of an embodiment of a U-shaped bracket in accordance with the principles of the present invention;

FIG. 5 is an enlarged fragmentary cross-sectional view of the use of an embodiment of an L-shaped bracket in accordance with the principles of the present invention;

FIG. 6 is a view generally along line 6—6 in FIG. 1;

FIG. 7 is a fragmentary elevational plane view of an embodiment of a tie down fastener in accordance with the principles of the present invention;

FIG. 8 is a view generally along line 8—8 of FIG. 7;

FIG. 9 is a diagrammatic view illustrating placement of articles in a trailer in accordance with the principles of the present invention;

FIG. 10 is a fragmentary diagrammatic view illustrating placement of the last two articles loaded on to the semitrailer in accordance with the principles of the present invention;

FIG. 11 is a diagrammatic elevational view illustrating separation of the articles due to the raised floor feature of the present invention; and FIG. 12 is a diagrammatic view illustrating the trailer backed up to a loading dock.

DETAILED DESCRIPTION OF A PREFERRED EMBODIMENT

Referring now to the drawings, there is shown in FIGS. 1 through 3 an embodiment of a semitrailer in accordance with the principles of the present invention, the trailer being designated generally by the reference numeral 20. The semitrailer generally includes two sidewalls 22, a front end wall 24, a top wall 26, a floor 28, and a back end 30 including two hingedly attached loading doors 32. As generally illustrated in FIG. 2, the walls and floor are supported by a support structure 34. As further illustrated, the floor portion 28 includes three general areas; the coupler area 36, the area over the support dollies 38, and the floor area 40 extending between back end of the trailer and the area 38. In discussing the features of a preferred embodiment, the detailed description of the floor portion 28 will be generally in terms of the floor area 40; however, it will be appreciated that the general principles of the present invention are also embodied in the other two floor areas 36 and 38. Indeed, in certain trailers these areas may not be present or may take on different variations.

As illustrated in FIG. 3 by the arrows 41, the support structure includes upwardly arched cross members 42 extending transversely of the trailer between two longitudinally extending support members 44 at the sides of the trailer and having a generally U-shaped cross section. In the embodiment shown, the trailer has an outside dimension of approximately 102 inches and an inside dimension of approximately 100½ inches. The cross member 42 is raised at least ⅜ of an inch proximate the center thereof. Suitably attached to the cross members and spanning between adjacent cross members are relatively flat, planar wood flooring members 46. It will be appreciated that the flooring members 46 might also be made of other materials such as aluminum. Accordingly, the flooring members 46 are arched or curved similarly to that of the cross members 42. The net result is to provide the top surface of the floor 28 of the trailer with a raised portion near the center thereof between the edges of the trailer. Accordingly, as diagrammatically illustrated in FIG. 11, when articles 48 and in particular pallets are loaded on to the trailer 20 so as to form two longitudinally extending rows as generally illustrated in FIGS. 9 and 10, the upper portion of the pallets 48 will be tilted away from each other towards the sidewalls of the trailer due to the curvature of the floor 28.

Typically, the pallets 48 are loaded into the trailer by a forklift or the like. Accordingly, as the forklift moves the pallets along the floor, the pallets 48 will be tilted outward thereby minimizing the chances that the pallets 48 will sway back and forth near their upper portion and engage one another so as to interfere with the loading process. The same general effect will be observed if the pallets 48 were merely slid along the floor into position. Accordingly, the present invention allows for much denser packing of the pallets and therefore maximizes the use of the available floor space.

It will be appreciated that alternate support structures and flooring configurations might be utilized in accordance with the principles of the present invention to provide a floor being raised near a center portion thereof. For example it might be possible to place a rib portion down the center of the floor the longitudinal extent thereof, thereby providing for a raised portion near the center of the floor without necessitating that the floor be arched or angled. Additionally, it will be appreciated that if standardized pallets are utilized having substantially different widths, then the raised portion might occur at a different location along the floor between the sidewalls such that the raised portion would be positioned proximate the inner adjacent sides of the pallets 48. Furthermore as illustrated, the pallets 48 may be staked on top of each other to provide multiple tiers of the pallets 48.

Yet another feature of a preferred embodiment of the present invention is illustrated in FIG. 4 wherein an enlarged cross sectional view of the U-shaped support member 44 is illustrated. As shown, a lower edge portion 50 of the sidewall 22 is reduced in thickness such that the combined thickness of the U-shaped support member 44 and the sidewall 22 when inserted into the U-shaped support member is generally that of the major portion of the sidewall 22. Accordingly, the interconnection of the U-shaped support member 44 to the sidewall 22 does not add to the overall width of the trailer whereby the sidewalls 22 may be positioned as far as apart as practically and legally allowable without having to be concerned with the lower edge portion 50 and its associated U-shaped member 44 being overwidth.

More particularly, the U-shaped support member 44 is shown as including a relatively flat member 52 along the outside surface of the sidewall 22 and a member 54 being generally L-shaped in cross section and extending along the bottom and inside surface of the sidewall 22. The members 52 and 54 being suitably interconnected and the sidewall 22 retainer therebetween by fastener apparatus 56. The L-shaped member 54 in turn is suitably attached to the cross member 42. It will be appreciated that the members 52 and 54 of the U-shaped member 44 might also be formed as an integral unit.

Additionally the outer end of the fasteners 56 might be covered by a reflector 57 to increase the visibility of the trailer thereby enhancing the safety of the vehicle.

In yet an alternative embodiment of the present invention as illustrated in FIG. 5, an L-shaped member 55 is utilized without the member 52. The sidewall 22 in turn is interconnected to the L-shaped member 55 by fasteners 59 whose outside ends are recessed into the outer surface of the sidewall 22 such that the outer surface remains generally flush with the remainder of the sidewall 22.

It will be appreciated that this method of interconnecting the sidewalls 22 to the support structure 34 enables the sidewalls 22 to be spaced as far apart as practically and legally allowable. This accordingly increases the amount of interior space available for hauling cargo thereby increasing the efficiency of the trailer.

In the preferred embodiment shown, the sidewall portions 22 are made of a fiberglass reinforced plywood comprising a plywood inner core 62 with a layer of fiberglass 64 on the inside and outside surfaces thereof.

As generally illustrated in FIG. 6, the preferred embodiment of trailer 20 includes a top rail member 70 which is interconnected to the sidewall 22 by suitable fasteners 72. The inside end of the fasteners 72 are embedded into the inside surface of the sidewalls 22 so as not to present an obstruction for the pallets 48 loaded into the trailer. Furthermore, in the preferred embodiment, the recesses 74 formed by embedding the fastener ends into the sidewall, are filled in with a material 76 such as poly-resin to provide a relatively smooth surface. The top rail members 70 thus provide for interconnection of the top wall 26 with sidewalls 22. With previous trailers, the fasteners of the top rail members 70 have interfered with the loading process due to the fact that they projected inwardly of the inner surface of the sidewalls 22 thereby presenting an obstruction. Removal of these obstructions facilitates loading and maximum use of available trailer space.

As further illustrated in FIGS. 7 and 8, the preferred embodiment of the present invention includes tie down fasteners 78 commonly referred to as D-rings which are recessed into the sidewalls 22 so as to also not project beyond the inner surface of the sidewalls and thereby interfere with loading of the pallets 48. As illustrated, in the preferred embodiment the D-ring apparatus 78 includes a relatively flat plate-like member 80 suitably secured to the outside surface of the sidewalls 22. An adhesive 82 might be utilized to adhesively bond the plate-like member 80 to the sidewall 22. The plate-like member 80 is positioned over an aperture 84 in the sidewall. Securely mounted to the inside surface of the plate-like member 80 in the aperture 84 of the sidewall is a bracket 86 for pivotally retaining a ring-like structure 88. Accordingly as illustrated in FIG. 8, the tie down fastener 78 is entirely positioned within the aperture 84 when not in use so as not to provide an obstruction which will interfere with the loading process. In use the articles or pallets 48 being hauled might be suitably secured to the side of the truck by interconnecting them to the tie down fasteners 78 if necessary. It will be further appreciated, that the tie down fastener of the present invention is very securely anchored in position due to the fact that the plate-like member 80 is mounted on the outside surface of the sidewall 22.

As illustrated in FIGS. 1, 9, and 10 the preferred embodiment of the present invention includes an offset door frame structure 90 for supporting the unloading doors 32 along the side edges thereof. The offset door frame includes a side frame member 90a having a thickness approximately that of the sidewall 22 and a frame member 90b on the opposite side thereof which has a width substantially greater than the thickness of the sidewall 22. Accordingly, the door frame member 90a does not significantly project inwardly to provide an obstruction so as to interfere with the loading of the pallets 48 on to the trailer 20. The door frame 90b provides the door frame structure 90 with sufficient strength to maintain the structural integrity of the trailer to prevent twisting and distortion thereof. Preferably, as illustrated in FIG. 12 the door frame member 90a is positioned on the driver's side of the trailer such that when backing into a loading dock 22 the driver can align his side of the trailer with the side edge of the loading dock. This is particularly useful on those trailers which have a width greater than existing loading docks. Accordingly, one side of the trailer will be generally aligned with the side of the loading dock so as to provide maximum access to the trailer from the loading dock with no obstruction. Articles may be loaded on to the driver's side of the trailer and then shifted laterally to the opposite side once inside the trailer thereby facilitating loading.

The present invention also relates to a method of loading articles into the trailer. In particular as illustrated in FIGS. 9 and 10, a preferred method of the present invention is to form two rows of articles or pallets 48 extending substantially across the entire width (a) and the length (b) of the trailer, the rows being designated generally by the reference numerals 100 and 102 in FIGS. 9 through 11. As illustrated, the row 100 is on the driver's side of the trailer, the row 102 being on the opposite side. Preferably the articles or pallets 48 are of a generally rectangular configuration and have dimensions represented by X and Y. The method includes placing a first article P1 in either of the rows 100 or 102. (In the embodiment shown, the pallets are marked P1 through P25 for ease of interpretation.) The side of the article or pallet 48 facing the back end of the trailer forms a leading edge 104 of that row. A second pallet, P2, is then loaded into the vacant row at the front end of the trailer, with the side of the pallet facing the back end of the trailer forming a leading edge 105 of that row. Third and subsequent pallets are then positioned in whichever the first or second rows whose leading edge is farthest away from the back end of the trailer. In the embodiment shown, the third article is positioned on the side of the trailer opposte of the driver. The third and subsequent articles or pallets are positioned in the same general orientation as the other articles in the row. As illustrated, the dividing line 106 between the two rows is generally near a center portion of the trailer 20, although it need not be in the exact center thereof. When it comes time for loading the last two pallets P24 and P25, the pallet which is to be positioned on the side of the trailer opposite that of the driver is positioned first in the trailer and then slid laterally into position. This allows the last pallet P25 to be slid directly into position and enables for a very tight packing of the pallets without interference by the offset frame structure 90.

In an alternate embodiment of the packing two pallets P24 and P25 are loaded onto the trailer so as to have the same general orientation; for example, the two pallets might both be loaded lengthwise. By utilizing such a loading method, the length of the rows 100, 102 might be such that the pallets are roughly adjacent the back end portion thereby reducing the amount of longitudinal shifting which occurs during transport.

In one particular embodiment of the present invention a trailer having an outside dimension of one hundred and two (102) inches and inside a dimension of one hundred and one-half (100½) inches is utilized. The pallets correspondingly have dimensions of forty-four (44) inches by fifty-six (56) inches. The pallets are loaded onto the trailer such that in the row 102 opposite that of the driver's side of the trailer, the pallets extend transversely of the trailer whereas in the row 100, the pallets extend generally longitudinally of the trailer. This particular trailer and pallet configuration provides for the loading pattern as generally shown in FIG. 9 when a fifty-three (53) foot trailer is utilized. An alternate loading method is illustrated in FIG. 10, wherein the pallets P24 and P25 are both positioned lengthwise. It will be appreciated that this loading method might be utilized for other lengths of trailers, such as a forty-eight foot, etc.

Although the method of loading the trailer of the present invention has been discussed and no method of the unloading process has been mentioned it will be appreciated that the pallet (25) on the driver's side of the trailer is unloaded first and then the remaining pallets may be unloaded in a fashion similar to the of the loading process.

The present invention thus provides for maximum use of the floor space available inside of a semitrailer. In particular, the present invention provides for maximum use of the floor space in a trailer having an outer dimension of roughly one hundred-two (102) inches wherein pallets having a dimension of forty-four (44) inches by fifty-six (56) inches are utilized. Furthermore, the present invention provides a trailer configuration which minimizes inside obstructions or projections interfering with the loading of pallets into the trailer.

It is to be understood, however, that even though numerous characteristics and advantages of the invention have been set forth in the foregoing description, together with details in the structure and function of the invention, the disclosure is illustrative only, and changes may be made in detail, especially in matters of shape, size and arrangement of parts within the principles of the invention, to the full extent indicated by the broad general meaning of the terms in which the appended claims are expressed.

What is claimed is:

1. A method of loading articles into a semitrailer, comprising the steps of:
   (a) placing the articles in generally rectangular pallets; and
   (b) loading the pallets into a semitrailer having an arched floor to form two rows of pallets extending longitudinally of the semitrailer and having a combined width of about one hundred (100) inches and the semitrailer having an inside width of less than about one hundred and two (102) inches, the pallets in each of said rows being orient to extend generally perpendicular to the pallets of the other row, said arched floor having a crown extending longitudinally of said semitrailer, said loading step including the steps of:
      (i) positioning a first pallet in either a first or second row at the front end of the trailer, the side of said pallet facing the back end of the trailer forming the leading edge of the row;
      (ii) positioning a second pallet in the vacant row at the front end of the semitrailer, said second pallet being oriented to extend generally perpendicular to the first pallet, the side of said second pallet facing the back end of the semitrailer forming the leading edge of its respective row; and
      (iii) placing a third and subsequent pallets one at a time in whichever of the first or second rows whose leading edge is farther forward, said third subsequent pallets being positioned in each of the rows in the same general orientation as the other pallets in the row.

2. A method in accordance with claim 1, wherein the first pallet is placed on the side of the trailer opposite the driver, said pallet being positioned such that the pallet extends generally transversely of the trailer.

3. A method in accordance with claim 2, wherein the last two pallets are placed in the trailer lengthwise such that they extend generally parallel to the trailer.

4. A method in accordance with claim 1, wherein the second to the last pallet placed in the trailer is placed on the side opposite the driver and the last pallet placed in the trailer is placed on the driver's side.

* * * * *

UNITED STATES PATENT AND TRADEMARK OFFICE
CERTIFICATE OF CORRECTION

PATENT NO. : 4,750,859

DATED : June 14, 1988

INVENTOR(S) : Oren et al.

It is certified that error appears in the above-identified patent and that said Letters Patent is hereby corrected as shown below:

In the Abstract, Line 11, "longitduinal" should be --longitudinal--.

Column 3, Line 35, after "novelty" insert --which--.

Column 7, Line 29, "opposte" should be --opposite--.

Column 8, Line 4, "to the of the" should be --to that of the--.

Signed and Sealed this

Thirty-first Day of January, 1989

Attest:

DONALD J. QUIGG

*Attesting Officer*   *Commissioner of Patents and Trademarks*